United States Patent
Hinrichs et al.

(10) Patent No.: US 12,052,974 B2
(45) Date of Patent: Aug. 6, 2024

(54) PIGLET-PROTECTION DEVICE FOR A FARROWING PEN, AND RESPECTIVE FARROWING PEN

(71) Applicant: BIG DUTCHMAN INTERNATIONAL GMBH, Vechta (DE)

(72) Inventors: Birgit Hinrichs, Vechta (DE); Rolf Wichmann, Vechta-Bergstrup (DE); Jens Drees, Bakum (DE); Stefan Gaeckle, Twinstringen (DE)

(73) Assignee: BIG DUTCHMAN INTERNATIONAL GMBH, Vechta (DE)

( * ) Notice: Subject to any disclaimer, the term of this patent is extended or adjusted under 35 U.S.C. 154(b) by 79 days.

(21) Appl. No.: 17/991,907

(22) Filed: Nov. 22, 2022

(65) Prior Publication Data
US 2023/0200347 A1 Jun. 29, 2023

(30) Foreign Application Priority Data
Nov. 26, 2021 (LU) ........................... 102880

(51) Int. Cl.
*A01K 1/02* (2006.01)

(52) U.S. Cl.
CPC .................. *A01K 1/0218* (2013.01)

(58) Field of Classification Search
CPC ...... A01K 1/02; A01K 1/0209; A01K 1/0218; A01K 1/0227
See application file for complete search history.

(56) References Cited

FOREIGN PATENT DOCUMENTS

| DE | 2420316 | 11/1975 |
|----|---------|---------|
| DE | 20315062 | 8/2004 |
| DE | 202014100501 | 2/2014 |
| EP | 1520470 | 4/2005 |
| EP | 3014986 | 5/2016 |

*Primary Examiner* — Joshua J Michener
*Assistant Examiner* — Henry Hooper Mudd
(74) *Attorney, Agent, or Firm* — PRICE HENEVELD LLP

(57) ABSTRACT

A piglet-protection device for a farrowing pen is equipped with a first side part, with a trough console, which is connected to the first side part, and with a second side part, which is connected to the trough console so as to be pivotable about a pivot axis. By pivoting the second side part, the piglet-protection device can be brought into a piglet-protection position, in which the second side part is arranged substantially parallel to the first side part, and into a movement position, in which the second side part is spread away from the first side part. A first door element and a second door element delimit the piglet-protection device at the rear in the piglet-protection position. The first door element and/or the second door element are arranged in a length-adjustable manner on the first and second side part, respectively.

17 Claims, 2 Drawing Sheets

PIGLET-PROTECTION DEVICE FOR A FARROWING PEN, AND RESPECTIVE FARROWING PEN

CROSS-REFERENCE TO FOREIGN PRIORITY APPLICATION

The present application claims the benefit under 35 U.S.C. §§ 119(b), 119(e), 120, and/or 365(c) of LU 102880 filed Nov. 26, 2021.

FIELD OF THE INVENTION

The invention relates to a piglet-protection device for a farrowing pen, having a first side part, having a trough console, which is connected to the first side part, and having a second side part, which is connected to the trough console so as to be pivotable about a pivot axis, wherein, by way of pivoting of the second side part, the piglet-protection device can be brought into a piglet-protection position, in which the second side part is arranged substantially parallel to the first side part, and into a movement position, in which the second side part is spread away from the first side part, wherein a first door element is arranged on the first side part and a second door element is arranged on the second side part, and wherein the door elements delimit the piglet-protection device at the rear in the piglet-protection position.

BACKGROUND OF THE INVENTION

Such piglet-protection devices for farrowing pens are known from the prior art. They are used, in particular in pig breeding, to support the mother animal, also referred to as sow, during the birth process. The birth process by the sow, in the case of pigs, is also referred to as farrowing. Piglet-protection devices furthermore serve the purpose of protecting newborn piglets from mechanical action, in particular entrapment, by the sow.

Besides static piglet-protection devices, piglet-protection devices which can be temporarily brought into a piglet-protection position and with which the movement area of the sow can be designed to be variable by means of pivotable side walls, so that, according to requirement, a relatively large movement area for the sow can be realized and a so-called movement pen is formed, are known.

Such piglet-protection devices are known from EP 3 014 986 B1, EP 1 520 470 A2 and DE 24 20 316 A1, and also from DE 20 2014 100 501 U1. A piglet-protection device having variable movement space for the mother animals is distributed for example by the company En-Sta Stalltechnik GmbH.

A disadvantage of these known apparatuses is that, although they provide a variable movement space for the sow in principle, there is often little space left behind the sow for it to undergo veterinary treatment, or to be assisted during the birth process, for example.

Furthermore, piglet-protection devices already known from the prior art normally have fixed dimensions, which do not allow, or allow only with difficulty, adaptation to the anatomy of the mother animal or to the dimensions of the farrowing pen. Furthermore, farrowing pens and piglet-protection devices already known from the prior art often require the temporary removal of parts, in particular of door elements, if for example veterinary treatment of the mother animal is to be carried out or assistance during the birth process is to be provided. The removal and intermediate storage of such parts that are taken out is however difficult in practice and, in some cases, entails a risk of injury to humans and animals. Also, with farrowing pens already known from the prior art, it has occasionally been observed that individual components or elements of piglet-protection devices project into the farrowing pen, which is likewise undesired. Furthermore, with known piglet-protection devices, in the movement position, for delimiting the movement space for the sow, besides pivoting of the side part, actuation of at least one, occasionally even two, door elements is normally also required. This can be disadvantageous with regard to operating convenience.

Against this background, the object on which the invention is based was to further develop a piglet-protection device and a farrowing pen of the type mentioned in the introduction such that the disadvantages found in the prior art are as far as possible eliminated. In particular, it was sought to specify a piglet-protection device which provides the sow with a variable movement space with piglet protection taken into account, which is simultaneously adaptable to different structural space requirements, and which furthermore provides a high level of operating comfort for the operator.

SUMMARY OF THE INVENTION

According to the invention, the object is achieved in the case of a piglet-protection device of the type mentioned in the introduction in that the first door element is arranged in a length-adjustable manner on the first side part and/or the second door element is arranged in a length-adjustable manner on the second side part.

The invention makes use of the realization that, by way of the length-adjustable arrangement of the respective door elements on the respective side parts, a high level of variability with regard to the configuration of the piglet-protection device is achieved. It is thus possible for such a piglet-protection device to be combined with differently dimensioned farrowing pens.

Furthermore, multiple use capability of the components of the piglet-protection device is additionally achieved in effect. In this regard, doors of the piglet-protection device are used for secure enclosure of the sow when the piglet-protection device is in the piglet-protection position. In the movement position, the door elements, through the use of their length adjustability, can be used for separating off a movement region for the sow and, in this respect, for providing a transformation of the piglet-protection device to a movement pen. During the transformation, the operator is always protected by the combination of door element and side part in relation to the mother animal. Due to the mechanics, the side part can remain in the piglet-protection position while the door element is being arrested. Subsequently, the side part can be pivoted open and the movement position can be reached. In this way, by means of the piglet-protection device according to the invention, the formation of both a classical piglet-protection cage with substantially parallel side parts and a movement pen is made possible. In this case, owing to its variable longitudinal extent, the piglet-protection device can be adapted to different farrowing-pen dimensions and configurations without the need for actuation of further pen elements.

Furthermore, space is provided, in particular behind the piglet-protection device, for support personnel, in order to make provision for example for assistance work during the birth process, in that in particular the door elements are pushed in the direction of the trough console. In this way, in comparison with solutions already known from the prior art, the person providing assistance or treatment is not confined, but can carry out measures ergonomically and with good accessibility. Furthermore, the movement space of the sow can, as already stated, be variably delimited in relation to the piglets and also the support personnel. In addition, the solution according to the invention makes possible different stabling concepts, for example, the so-called head and parallel stabling or else an aisle stabling. Altogether, the use of removable doors is not required, and for this reason the piglet-protection device or the farrowing pen has in particular fewer separate components than solutions already known from the prior art.

According to a preferred embodiment, the door element is arranged in a length-adjustable manner on the side part by means of a sliding-rail arrangement. Preferably, the first door element is arranged in a length-adjustable manner on the first side part by means of a first sliding-rail arrangement, and the second door element is arranged in a length-adjustable manner on the second side part by means of a second sliding-rail arrangement. The sliding-rail arrangement makes it possible to realize robust and precise length adjustability of the door elements relative to the side parts.

The invention is further developed in that the sliding-rail arrangement has a slotted guide which is arranged on the side part, wherein the door element has a guide section which is displaceably received in the slotted guide. Preferably, the guide section is received in the slotted guide so as to be pivotable about a pivot axis. In this way, not only is relative adjustability, in the form of length adjustability, achieved between door element and side part, but also pivoting of the respective door element relative to the corresponding side part is made possible. In this way, the flexibility of the piglet-protection device is further increased, in particular, in relation to the adaptability thereof to differently configured farrowing pens and farrowing-pen dimensions. Again, due to the pivotable arrangement, consideration is given to the idea of making possible multiple use of the door elements as a piglet-protection cage, for length adjustment and for sep-aration or transformation of the piglet-protection cage to a movement pen, wherein, in this respect, the outer delimitation of the movement pen and thus also the movement region of the sow can be set in a flexible manner. This makes it possible to realize a width of the movement pen of for example 3.1 metres. In the case of veterinary measures, the door element can be adjusted parallel to the side parts by means of the sliding-rail arrangement whereby the distance between the side part and a separating wall of the farrowing pen is increased, in particular in relation to solutions known from the prior art, in which the side part is rigid and, as it were, drawn through to a great extent.

According to a preferred embodiment, the pivot axis is arranged substantially vertically. The expression "substantially vertically" is to be understood here as meaning that an exactly vertical arrangement of the pivot axis and deviations by ±10° therefrom are included. Preferably, the first side part and/or the second side part are/is in the form of a grid-like side part. In this way, the sow is guided securely by means of the side parts, wherein at the same time it is still ensured that the farrowing and suckling of the piglets is hindered as little as possible.

According to a preferred embodiment, the first and/or the second side part have/has a piglet deflector. Preferably, the piglet deflector has a lying-down aid for the mother animal. The piglet deflectors ensure that the piglets are protected from mechanical action by the sow. In particular, the sow is guided, and in this case supported, by the piglet deflector or the lying-down aid when lying down, wherein the sow, when sliding against the piglet deflector or the lying-down aid, is in effect diverted away from the piglets. Furthermore, in particular, if the piglet-protection device is in the piglet-protection position, it is achieved that the lying-down speed or the lying-down of the sow is slowed down overall, whereby the risk of injury for the piglets can be reduced.

Preferably, the piglet deflector is arranged spaced apart from a lower edge of the side part, in particular, wherein the side part has multiple substantially horizontally extending tubular elements which are arranged one above the other, and wherein the piglet deflector is arranged on a tubular element which, as viewed from the lower edge of the side part, is the second tubular element, in particular, is welded thereto. The respective arrangement has turned out to be particularly suitable for supporting the sow when it lies down.

According to a further preferred embodiment, the door element has a first section, which extends from the guide section and, in the piglet-protection position, extends substantially parallel to the side parts, and has at least one second section, which adjoins the first section and, in the piglet-protection position, extends in the direction of a rear side of the piglet-protection device and inwards.

With furthermore preference, the door element has a third section, which extends from the second section and, in the piglet-protection position, is directed inwards substantially at a right angle to the side parts. The respective formation of the door elements has proven to be particularly suitable for providing a secure delimitation of the movement space of the sow in the piglet-protection position, on the one hand, and for providing, according to the idea of multiple use capability, a movement pen with flexible outer dimensions, on the other hand.

Preferably, a locking means is arranged on at least one of the door elements, and is configured to lock the door elements, in particular to one another, in the piglet-protection position. The invention is further developed in that the trough console has a climbing prevention means, which has in particular one or more tubular elements, wherein the tubular elements are arranged on the trough console at the upper side substantially at a right angle to the first side part. The climbing prevention means prevents undesired climbing onto individual elements of the trough console by the sow. Preferably, the trough console has a support for two adjacently arranged piglet-protection devices. The trough console is preferably configured to be arranged with a pig-let-protection device and relative to a further piglet-protection device in a head-to-head manner.

Preferably, the support is integrated into a separating wall of a farrowing pen. According to an alternative embodiment, the support is mounted on a fixed wall. Preferably, the trough console has a depth which is adapted to the dimensions and requirements of an adjacently arranged piglet nest. The trough console is preferably furthermore configured to receive a fixed and/or tiltable trough. Furthermore, the trough console preferably has fastening points for re-ceiving a drinking container for mother and offspring directly on the trough console. According to an alternatively preferred embodiment, the trough console is configured to receive a feeding grid which makes possible visual contact between two sows standing head to head, or else to receive a separator which blocks a corresponding visual connection.

The invention has been described above with reference to a piglet-protection device. In a further aspect, the invention relates to a farrowing pen having a piglet-protection device. The invention achieves the object mentioned in the introduction with regard to the farrowing pen in that this is designed according to one of the preceding exemplary embodiments. The farrowing pen makes use of the same advantages and preferred embodiments as the piglet-protection device according to the invention, and vice versa. In this respect, reference is made to the state-ments above, and the content thereof is incorporated here.

The farrowing pen is further developed in that the first side part is arranged spaced apart from and, in particular, parallel to an outer enclosure of the farrowing pen. In other words, the first side part, which is preferably arranged fixedly relative to the farrowing pen, may be arranged at a freely selectable distance from an outer enclosure or wall of the farrowing pen in such a way that a corridor or retreat space for the piglets is formed between the enclosure and the first side part. Said corridor is accessible from the farrowing pen and may be used, for example, for re-moving piglets from the pen.

According to a preferred embodiment, the farrowing pen has a contact grid, wherein the door elements are configured to be arrested adjacent to the contact grid in the movement position. In this way, a movement region for the sow in the form of a movement pen is defined and provided solely by the piglet-protection device and the contact grid without the need for use to be made here of further stable equipment, such as for example grids, delimitations, or the like. In other words, by means of the piglet-protection device and farrowing pen according to the invention, the movement region can be configured in a flexible manner in terms of width and length without additional elements of stabling material that projects into the pen or that would have to be additionally pivoted or temporarily removed.

BRIEF DESCRIPTION OF THE DRAWINGS

The invention will be described in more detail below on the basis of a preferred exemplary embodiment with reference to the appended Figures.

In the figures.

DETAILED DESCRIPTION OF THE EMBODIMENTS

Figure 1:
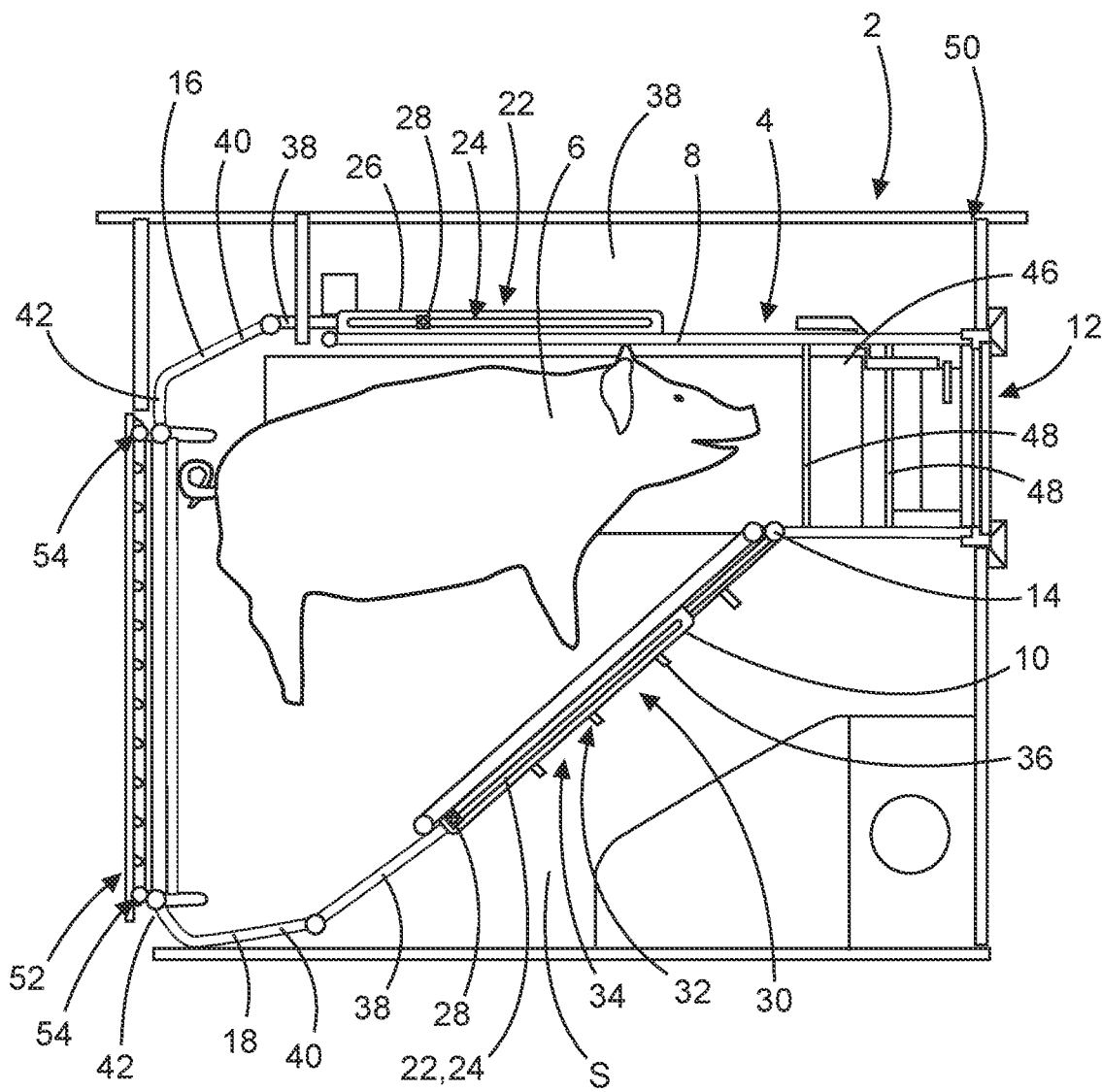
FIG. 1 shows, in a plan view, an exemplary embodiment of a farrowing pen according to the invention with a piglet-protection device in a movement position.
Figure 2:
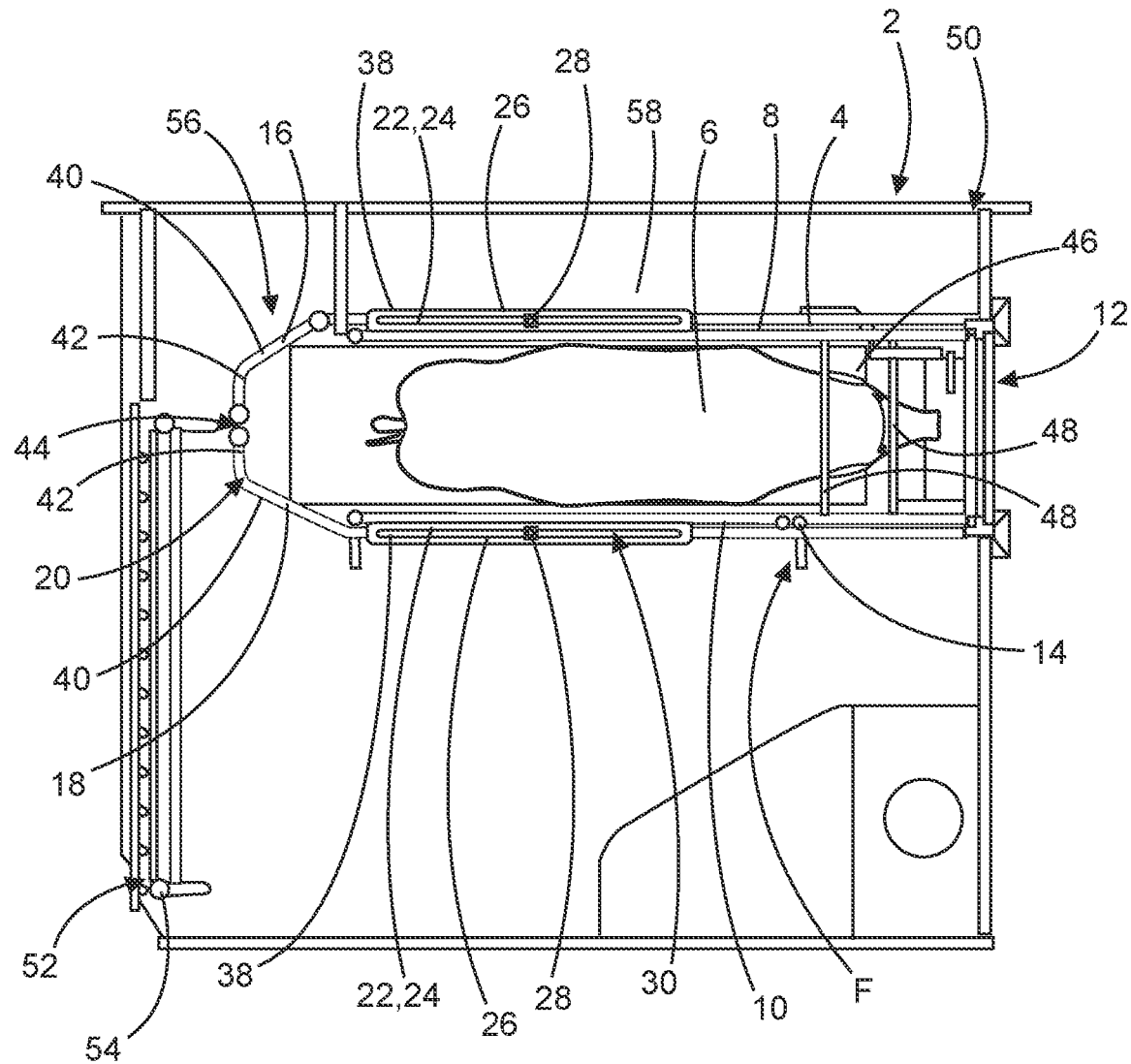
FIG. 2 shows, in a plan view, the exemplary embodiment of the farrowing pen according to the invention with the piglet-protection device in a piglet-protection position.

FIG. 1 shows a farrowing pen 2. The farrowing pen 2 has an outer enclosure 50 and a contact grid 52 which is arranged in an immovable (fixed) manner. The contact grid 52 may alternatively also be in the form of a stabling element, in particular, a pen profile. A piglet-protection device 4 is arranged in the farrowing pen 2. The contact grid 52 is preferably at least the same height as the piglet-protection device 4. The piglet-protection device 4 has a first side part 8. A trough console 12 is connected to the first side part 8. Furthermore, a second side part 10 is connected to the trough console 12. The second side part 10 is connected to the trough console 12 so as to be pivotable about a pivot axis 14. The piglet-protection device 4 can be brought into a movement position S, which is shown in FIG. 1, by way of pivoting of the second side part 10. In the movement position S, the second side part 10 is spread away from the first side part 8. The piglet-protection device 4 can furthermore be brought into a piglet-protection position F, which is shown in FIG. 2, by way of pivoting of the second side part 10. In the piglet-protection position F, the second side part 10 is arranged and oriented substantially parallel to the first side part 8.

A first door element 16 is arranged on the first side part 8. A second door element 18 is arranged on the second side part 10. The door elements 16, 18 delimit the piglet-protection device 4 at the rear in the piglet-protection position F. The first door element 16 is arranged in a length-adjustable manner on the first side part 8. The second door element 18 is arranged in a length-adjustable manner on the second side part 10. The respective door elements 16, 18 are arranged in a length-adjustable manner on the respective first side part 8 and second side part 10 in each case by means of a sliding-rail arrangement 22. Each of the sliding-rail arrangements 22 has a slotted guide 24 which is arranged on the side part 8, 10. The door elements 16, 18 have a guide section 26 which is displaceably received in the slotted guide 24. The guide section 26 is received in the slotted guide 24 so as to be pivotable about a pivot axis 28. The pivot axis 28 is arranged substantially vertically.

The first side part 8 and the second side part 10 are in the form of a grid-like side part 8, 10. The second side part 10 has a piglet deflector 30. The piglet deflector 30 has a lying-down aid 32 for a mother animal 6, in particular, for a sow 6. The piglet deflector 30 is arranged spaced apart from a lower edge 34 of the side part 10. The side part 10 has multiple substantially horizontally extending tubular elements 36 which are arranged one above the other. The piglet deflector 30 is arranged on a tubular element 36 which, as viewed from the lower edge 34 of the side part 10, is the second tubular element, and is welded thereto.

The first door element 16 and the second door element 18 each have a first section 38, which extends from the guide section 26 and, in the piglet-protection position F, extends substantially parallel to the side parts 8, 10. The first door element 16 and the second door element 18 furthermore have a second section 40, which adjoins the first section 38 and, in the piglet-protection position, extends in the direction of a rear side 56 of the piglet-protection device 4 and inwards. The first door element 16 and the second door element 18 furthermore have a third section 42, which extends from the second section 40 and, in the piglet-protection position F, is directed inwards substantially at a right angle to the side parts 8, 10.

A locking means 44 is arranged on one or both door elements 16, 18. The locking means 44 is configured to lock the door elements 16, 18 to one another in the piglet-protection position F. The trough console 12 has a climbing prevention means 46. The climbing prevention means 46 has multiple, in particular two, tubular elements 48. The tubular elements 48 are arranged on the trough console 12 at the upper side substantially at a right angle to the first side part 8.

The first side part 8 is arranged spaced apart from and in particular parallel to the outer enclosure 50 of the farrowing pen, so that a piglet retreat space 58 is formed between the outer enclosure 50 of the farrowing pen 2 and the first side part 8. As shown in FIG. 1, the door elements 16, 18 of the piglet-protection device 4 are configured to be arranged, in particular arrested, adjacent to the contact grid 52 of the farrowing pen 2 in the movement position S. In other words, in the movement position S shown in FIG. 1, the movement area of the sow 6 is thus delimited exclusively by the piglet-protection device 4, when considered jointly with the contact grid 52. No further stabling equipment components are required in this regard.

FIG. 2 shows the farrowing pen 2 according to the invention with the piglet-protection device 4, wherein the piglet-protection device 4 is in the piglet-protection position F. In this case, in comparison with FIG. 1, the second side part 10 has been pivoted in such a way that it is now arranged substantially parallel to the first side part 8. By means of the sliding-rail arrangement 22, the length of the piglet-protection device 4 in the piglet-protection position F can be adapted to the anatomy of the sow 6, in particular to the length of its body. The first door element 16 and the second door element 18 have been pivoted in such a way that these now form a rear delimitation 20. By means of the locking means 44, the door elements 16, 18 can be locked to one another. As emerges from FIG. 2, a sufficiently large volume remains adjacent to and behind the sow 6, in order for said sow to for example undergo veterinary treatment or be assisted at the time of farrowing.

The invention claimed is:

1. A piglet-protection device for a farrowing pen, comprising:
    a first side part;
    a trough console connected to the first side part, and
    a second side part connected to the trough console so as to be pivotable about a pivot axis;
    wherein, by way of pivoting of the second side part, the piglet-protection device can be brought into a piglet-protection position, in which the second side part is arranged substantially parallel to the first side part, and into a movement position, in which the second side part is spread away from the first side part;
    wherein a first door element is arranged on the first side part and a second door element is arranged on the second side part, the first and second door elements delimiting the piglet-protection device at the rear in the piglet-protection position; and
    wherein the first door element is arranged in a length-adjustable manner on the first side part and/or the second door element is arranged in a length-adjustable manner on the second side part.

2. The piglet-protection device according to claim 1, wherein the first or second door element is arranged in a length-adjustable manner on the first or second side part, respectively, by means of a sliding-rail arrangement.

3. The piglet-protection device according to claim 2, wherein the sliding-rail arrangement comprises a slotted guide arranged on the first or second side part, and wherein the first or second door element has a guide section which is displaceably received in the slotted guide.

4. The piglet-protection device according to claim 3, wherein the guide section is received in the slotted guide so as to be pivotable about a pivot axis.

5. The piglet-protection device according to claim 4, wherein the pivot axis is arranged substantially vertically.

6. The piglet-protection device according to claim 1, wherein the first side part and/or the second side part is in the form of a grid-like side part.

7. The piglet-protection device according to claim 1, wherein the first and/or the second side part have/has a piglet deflector.

8. The piglet-protection device according to claim 7, wherein the piglet deflector has a lying-down aid for a mother animal.

9. The piglet-protection device according to claim 7, wherein:
    the piglet deflector is arranged spaced apart from a lower edge of the side part;
    the side part has multiple substantially horizontally extending tubular elements which are arranged one above the other; and
    the piglet deflector is arranged on a tubular element which, as viewed from the lower edge of the side part, is the second tubular element.

10. The piglet-protection device according to claim 1, wherein the first or second door element comprises a first section extending from the guide section and, in the piglet-protection position, extends substantially parallel to the first and second side parts, and has at least one second section adjoining the first section and, in the piglet-protection position, extends in the direction of a rear side of the piglet-protection device and inwards.

11. The piglet-protection device according to claim 10, wherein the first or second door element further comprises a third section extending from the second section and, in the piglet-protection position, is directed inwards substantially at a right angle to the first and second side parts.

12. The piglet-protection device according to claim 1, wherein a locking means is arranged on at least one of the first or second door elements, and is configured to lock the first and second door elements to one another in the piglet-protection position.

13. The piglet-protection device according to claim 1, wherein the trough console comprises one or more tubular elements, wherein the tubular elements are arranged on the trough console at the upper side substantially at a right angle to the first side part.

14. A farrowing pen having a piglet-protection device, wherein the piglet-protection device comprises:
    a first side part;
    a trough console connected to the first side part; and
    a second side part connected to the trough console so as to be pivotable about a pivot axis;
    wherein, by way of pivoting of the second side part, the piglet-protection device can be brought into a piglet-protection position, in which the second side part is arranged substantially parallel to the first side part, and into a movement position, in which the second side part is spread away from the first side part;
    wherein a first door element is arranged on the first side part and a second door element is arranged on the second side part, the first and second door elements delimiting the piglet-protection device at the rear in the piglet-protection position; and
    wherein the first door element is arranged in a length-adjustable manner on the first side part and/or the second door element is arranged in a length-adjustable manner on the second side part.

15. The farrowing pen according to claim 14, wherein the first side part is arranged spaced apart from and parallel to an outer enclosure of the farrowing pen.

16. The farrowing pen according to claim 14, wherein the farrowing pen has a contact grid and the first and second door elements are configured to be arrested adjacent to the contact grid in the movement position.

17. A piglet-protection device for a arrowing pen comprising:
    a first side part, a second side part, and a trough console connected to the first and second side parts; and
    a first door element coupled to the first side part and a second door element coupled to the second side part;
    wherein the piglet-protection device has a piglet-protection position, in which the first and second side parts are parallel, and a movement position, in which the second side part is spread away from the first side part, whereby the piglet protection position is obtained by pivoting the second side part about a pivot axis from the movement position to the piglet-protection position;

wherein the first and second door elements delimit the piglet-protection device at the rear of the piglet-protection position; and wherein the first door element and the second door element are adjustably mounted to the first and second side parts, respectively, in a length-adjustable manner.

* * * * *